May 21, 1946.    C. H. PARKER ET AL    2,400,708
CLAMPING APPARATUS
Filed June 16, 1943

WITNESSES:

INVENTORS
CHARLES H. PARKER &
WILLIAM W. COVINGTON
BY
ATTORNEY

Patented May 21, 1946

2,400,708

UNITED STATES PATENT OFFICE 2,400,708

CLAMPING APPARATUS

Charles H. Parker and William W. Covington, Lansdowne, Pa., assignors to Westinghouse Electric Corporation, East Pittsburgh, Pa., a corporation of Pennsylvania Application June 16, 1943, Serial No. 491,046

1 Claim. (Cl. 90—59)

This invention relates to clamps, more particularly to a combined clamp and block assembly for securing work, to be machined, in position upon the work table of the machine involved, and it has for an object to provide improved apparatus of this character.

Yet another object of the invention is to provide a set of cooperating block members of standard lengths or sizes, which may be assembled in vertical relation to provide a block structure of any desired height for clamping various sizes of work.

Another object of the invention is to provide a clamp capable of use over a considerable range of variation in height of the work to be clamped.

Figure 1:
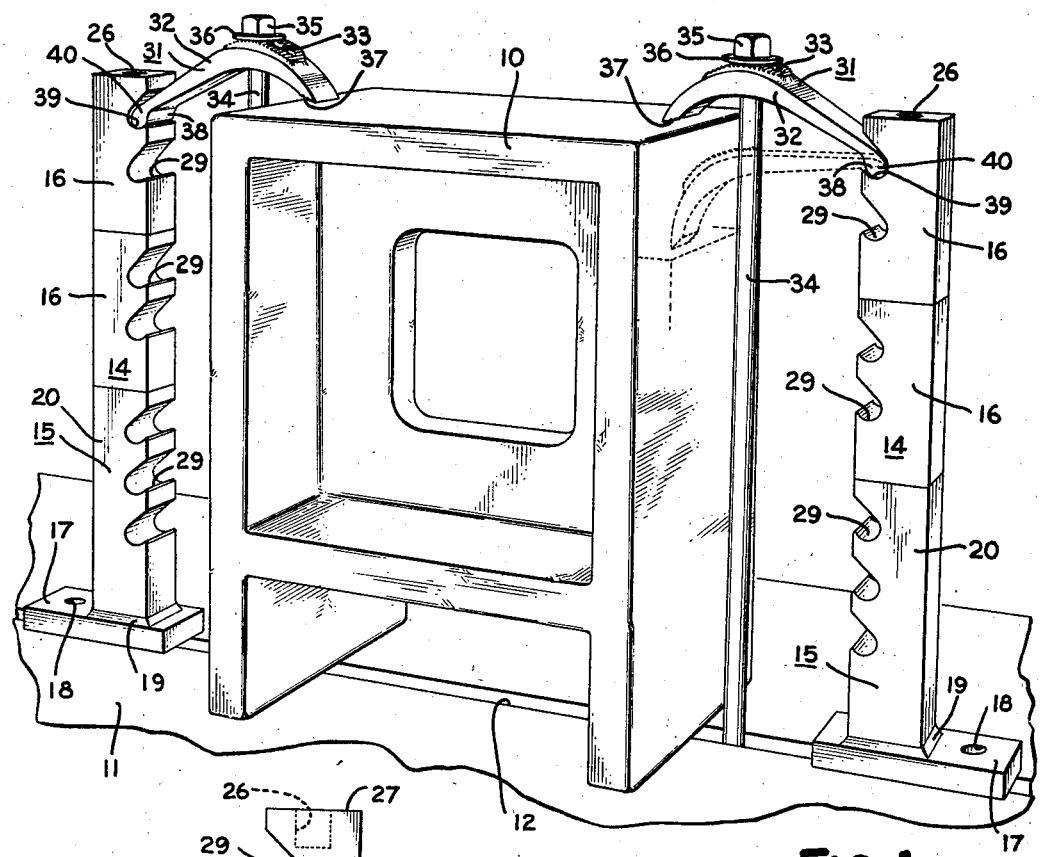
Figure 2:
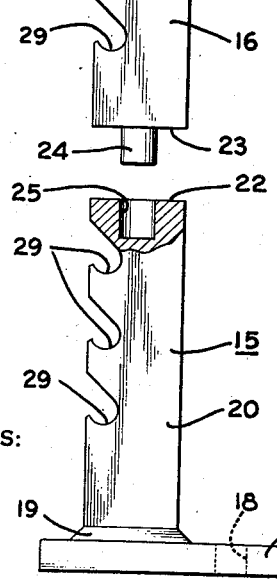

These and other objects are effected by the invention as will be apparent from the following description and claim taken in connection with the accompanying drawing, forming a part of this application, in which:

Fig. 1 is a perspective view of clamping apparatus constructed in accordance with the present invention; and Fig. 2 is an exploded view of one of the clamping block assemblies of Fig. 1.

Referring now to the drawing more in detail, there is shown, at 10, a piece of work to be clamped upon the work table 11 of any desired machine, such as a planer, shaper, milling machine, etc. The clamp block or rest assembly 14 comprises a base member 15 and one or more riser members 16. The base member 15 is provided with a lateral projection 17, having an opening 18 therethrough for the passage of a T-head bolt (not shown), the T-head thereof being adapted to be received in the usual T slot 12 provided in the machine table 11. There is secured to the base by suitable means, such as the welding, at 19, a vertical section 20 having a flat upper surface 22 adapted to support a riser member 16, having a corresponding flat undersurface 23. The undersurface 23 of the riser is preferably provided with a dowel pin 24 adapted to be received in a mating dowel opening 25 formed in the upper flat surface 22 of the base member 15. The upper flat surface 27 of the riser 16 is likewise provided with a dowel opening 26 for reception of the depending dowel on the adjacent riser member 16 thereabove, should the use of such additional riser be desired.

One vertical face of each base member and each riser is provided with a series of vertically-spaced, transversely-extending notches 29, preferably inclined downwardly and inwardly from the face of the members.

A strap-type clamp 31 comprising an arched body portion 32, having an opening 33 therethrough for reception of a clamping bolt 34, through which clamping pressure is applied by the nut 35 and cooperating washer 36, is provided with a lower work-engaging face 37 on the undersurface of one end and with a transversely-extending bead 38 on the undersurface of the opposite end. This transversely-extending bead 38 and its associated clamp end are rounded, as at 39, to provide a bulb-shaped rocker-like support 40, adapted to be received in and rest upon one of the notches 29 in a riser 16 or in a base member 15.

It will be apparent that this rounded or bulb-shaped supporting end 40 on the clamp 31 permits of satisfactory use of the clamp for work of varying heights without changing the notch occupied by the supporting end of the clamp. In other words, the clamp may be positioned against an upper work surface at a level materially higher than that of the notch 29, as shown in full lines (Fig. 1), or at a level much lower than the notch, as indicated by the dotted line showing in Fig. 1.

It will be obvious to those skilled in the art that the number of risers used may vary, being either more or less than as herein illustrated, and that under certain circumstances the risers may be entirely dispensed with and only the base member 15 used.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claim.

What is claimed is:

A work-holding device comprising a plurality of blocks adapted to be positioned one upon another in column formation, each of said blocks having formed in one vertical side face a plurality of vertically-spaced transverse notches inclined downwardly and inwardly from said face; means for interlocking said blocks in column formation with the notched faces vertically aligned; and a bowed strap-type clamp having a work-engaging face on the under surface of one end portion and a transverse rib on the under surface of the other end portion, said rib and the adjacent clamp end being rounded and adapted to be received in the bottom of a notch of the uppermost block, and the ribbed clamp end and notches being substantially coextensive lengthwise of the latter.

CHARLES H. PARKER.
WILLIAM W. COVINGTON.